(12) United States Patent
Becker et al.

(10) Patent No.: US 10,989,871 B2
(45) Date of Patent: Apr. 27, 2021

(54) PROTECTION LAYERS FOR POLYMER MODULATORS/WAVEGUIDES

(71) Applicant: Lightwave Logic Inc., Longmont, CO (US)

(72) Inventors: Richard Becker, Cupertino, CA (US); Michael Lebby, San Francisco, CA (US); Youngwoo Yi, Louisville, CO (US)

(73) Assignee: Lightwave Logic Inc., Englewood, CO (US)

( * ) Notice: Subject to any disclaimer, the term of this patent is extended or adjusted under 35 U.S.C. 154(b) by 0 days.

(21) Appl. No.: 16/690,491

(22) Filed: Nov. 21, 2019

(65) Prior Publication Data

US 2020/0088941 A1 Mar. 19, 2020

Related U.S. Application Data

(62) Division of application No. 15/857,336, filed on Dec. 28, 2017, now Pat. No. 10,520,673.

(51) Int. Cl.
*G02B 6/122* (2006.01)
*G02B 6/132* (2006.01)
(Continued)

(52) U.S. Cl.
CPC ....... *G02B 6/1221* (2013.01); *G02B 6/12004* (2013.01); *G02B 6/132* (2013.01); *G02F 1/00* (2013.01); *G02B 6/1228* (2013.01); *G02B 2006/12069* (2013.01); *G02B 2006/12097* (2013.01); *G02B 2006/12121* (2013.01); *G02B 2006/12142* (2013.01); *G02B 2006/12176* (2013.01)

(58) Field of Classification Search
CPC ... G02B 6/132; G02B 6/1221; G02B 6/12004
USPC .......................................................... 385/131
See application file for complete search history.

(56) References Cited

U.S. PATENT DOCUMENTS

| | | | |
|---|---|---|---|
| 4,504,113 A * | 3/1985 | Baak | C03C 25/1061 385/128 |
| 6,341,189 B1 * | 1/2002 | Deacon | G02B 6/1228 385/130 |

(Continued)

*Primary Examiner* — Kaveh C Kianni
(74) *Attorney, Agent, or Firm* — Parsons & Goltry; Robert Parsons; Michael Goltry (57) ABSTRACT

A polymer waveguide/modulator including a lower cladding layer, a polymer core, an upper cladding layer, a first protection/barrier layer sandwiched between the lower cladding layer and the core, and a second protection/barrier layer sandwiched between the core and the upper cladding layer. The protection/barrier layers designed to protect the cladding layers and the core from solvents and gases and to prevent current leakage between the cladding layers and the core. The first protection/barrier layer is optically transparent and designed with a refractive index less than, greater than, or the same as the refractive index of the core and approximately equal to the refractive index of the lower cladding layer. The second protection/barrier layer is optically transparent and designed with a refractive index less than, greater than, or the same as the refractive index of the core and approximately equal to the refractive index of the upper cladding layer.

11 Claims, 5 Drawing Sheets

(51) Int. Cl.
*G02B 6/12* (2006.01)
*G02F 1/00* (2006.01)
*G02B 6/13* (2006.01)

(56) References Cited

U.S. PATENT DOCUMENTS

| | | | | |
|---|---|---|---|---|
| 6,383,815 B1* | 5/2002 | Potyrailo | ............ | G01N 21/7703 |
| | | | | 422/82.08 |
| 6,917,636 B2* | 7/2005 | Blauvelt | ................ | H01S 5/026 |
| | | | | 372/102 |
| 6,934,313 B1* | 8/2005 | Deacon | ................ | H01S 5/4062 |
| | | | | 372/64 |
| 6,987,913 B2* | 1/2006 | Blauvelt | ............ | G02B 6/12002 |
| | | | | 385/28 |
| 7,106,448 B1* | 9/2006 | Vawter | ................ | G01C 19/72 |
| | | | | 356/461 |
| 7,233,713 B2* | 6/2007 | Blauvelt | ................ | G02B 6/132 |
| | | | | 385/129 |
| 7,565,084 B1* | 7/2009 | Wach | ................ | H04B 10/506 |
| | | | | 398/183 |
| 2002/0110839 A1* | 8/2002 | Bach | ................ | B82Y 5/00 |
| | | | | 435/7.9 |
| 2003/0049865 A1* | 3/2003 | Santini, Jr. | ............ | A61K 9/0097 |
| | | | | 436/518 |
| 2005/0002631 A1* | 1/2005 | Yamaguchi | .......... | G02B 6/1221 |
| | | | | 385/130 |
| 2010/0015741 A1* | 1/2010 | Krug | ................ | G02F 1/065 |
| | | | | 438/31 |
| 2010/0040904 A1* | 2/2010 | Cloutier | ................ | B32B 27/36 |
| | | | | 428/626 |
| 2014/0004638 A1* | 1/2014 | Rabiei | ................ | B82Y 20/00 |
| | | | | 438/31 |
| 2015/0001175 A1* | 1/2015 | Rabiei | ................ | G02B 6/03677 |
| | | | | 216/24 |
| 2015/0063753 A1* | 3/2015 | Evans | ................ | G02B 6/132 |
| | | | | 385/37 |
| 2016/0131837 A1* | 5/2016 | Mahgerefteh | .......... | G02B 6/126 |
| | | | | 385/14 |
| 2017/0015821 A1* | 1/2017 | Dou | ................ | B32B 7/12 |
| 2017/0179680 A1* | 6/2017 | Mahgerefteh | ................ | G02B 6/305 |
| 2018/0081118 A1* | 3/2018 | Klamkin | ................ | H01S 5/187 |

* cited by examiner

| FILM TYPE | OTR @ 73°F (23°C), 0% RH | |
|---|---|---|
| | (cc/100 in2/24hr) | (cc/m2/24hr) |
| THE FOLLOWING OTRs ARE BULK MATERIAL PROPERTIES DISPLAYED AT 1 MIL. YOU MAY DIVIDE BY THE GAUGE (IN MIL) IN ORDER TO APPROXIMATE OTR AT A DIFFERENT THICKNESS | | |
| EVOH* (ETHYLENE VINYL ALCOHOL) | .005-.12 | .08-.19 |
| BIAX NYLON-6 | 1.2-2.5 | 18.6-39 |
| OPET (ORIENTED POLYESTER) | 2-6 | 31-93 |
| OPP | 100-160 | 1550-2500 |
| CAST PP | 150-200 | 2300-3100 |
| HDPE (HIGH DENSITY POLYETHYLENE) | 150-200 | 2300-3100 |
| OPS (ORIENTED POLYSTYRENE) | 280-400 | 4350-6200 |
| LDPE (LOW DENSITY POLYETHYLENE) | 450-500 | 7000-8500 |
| THE FOLLOWING OTRs ARE ENHANCED BY COATING OR METALLIZING. THEREFORE, THESE ARE NOT BULK FILM PROPERTIES, AND TOTAL FILM THICKNESS HAS LITTLE IMPACT ON THE OTR VALUE. | | |
| METALLIZED OPET | .01-.11 | .16-1.7 |
| PVOH- COATED OPP (AOH) | .02 | .31 |
| METALLIZED BIAX MYLON-6 | .05 | .78 |
| PVdC- COATED OPET | .30-.50 | 4.7-7.8 |
| HIGH BARRIER PVdC- COATED OPP | .30-.60 | 4.7-9.3 |
| PVdC- COATED BIAX NYLON-6 | .35-.50 | 4.7-7.8 |
| METALLIZED OPP | 1.2-10 | 19-160 |
| SEALABLE PVdC- COATED OPP | 1.5-3.5 | 23-54 |

PROTECTION LAYERS FOR POLYMER MODULATORS/WAVEGUIDES

CROSS-REFERENCE TO RELATED APPLICATIONS

This application is a divisional application of currently pending U.S. application Ser. No. 15/857,336, filed 28 Dec. 2017.

FIELD OF THE INVENTION

This invention relates to protection layers for use in polymer waveguides and especially in polymer modulators.

BACKGROUND OF THE INVENTION

Laser modulators have been in use for 20 years. Initially discrete lasers were positioned next to discrete modulators so that higher performance signaling (and speeds above 10 Gbps) could be attained. While this technique has been commercialized it is not optimized. That is it does not reach the low cost targets, or space/size requirements, and takes lots of time to align the components, place them, package them, and test them.

In two copending patent applications semiconductor lasers and polymer modulators are integrated on a common platform to provide more efficient coupling between the source laser and the optical modulator. A first one of the two applications is entitled "Polymer Modulator and Laser Integrated on a common Platform and Method", filed Aug. 31, 2017, with Ser. No. 15/692,080, and a second one of the two applications is entitled "Guide Transition Device with Digital Grating Deflectors and Method" filed Nov. 14, 2017, with Ser. No. 15/812,630, both are incorporated herein by reference.

In the preferred process for fabricating the polymer modulators/waveguides the various layers are deposited in liquid form, which involves the use of solvents. These solvents can affect the abutting or surrounding layers. Also, the polymer modulators generally operate through the application of an electrical field, which is generally produced by connecting electrical contacts on opposed sides of the modulator. Thus, care must be taken to eliminate or minimize electrical leakage through the various polymer layers. Further, because the polymer modulators/waveguides are basically a "sandwich" of layers, which may or may not vary in characteristics, the index of refraction for the various layers must be considered.

It would be highly advantageous, therefore, to remedy the foregoing and other deficiencies inherent in the prior art.

Accordingly, it is an object of the present invention to provide new and improved protection layers for use in polymer modulators/waveguides.

It is another object of the present invention to provide new and improved protection layers that provide protection from various solvents, gasses and for electrical charges.

It is another object of the present invention to provide new and improved protection layers that provide optical continuity with similar optical refractive indices for cladding and core layers.

SUMMARY OF THE INVENTION

Briefly to achieve the desired objects and advantages of the instant invention in accordance with a preferred embodiment a polymer waveguide/modulator includes a lower cladding layer, a polymer core, an upper cladding layer, a first protection/barrier layer sandwiched between the lower cladding layer and the core, and a second protection/barrier layer sandwiched between the core and the upper cladding layer. The protection/barrier layers are designed to protect the lower and upper cladding layers and the core from solvents and gases and to prevent current leakage between the cladding layers and the core. The first protection/barrier layer is optically transparent and designed with a refractive index less than, greater than, or the same as the refractive index of the core and approximately equal to the refractive index of the lower cladding layer. The second protection/barrier layer is optically transparent and designed with a refractive index less than, greater than, or the same as the refractive index of the core and approximately equal to the refractive index of the upper cladding layer. Generally, it should be understood that both the first and second protection/barrier layers are thin enough that differences between indexes of refraction of a protection/barrier layer and a core or cladding layer does not significantly affect light guiding of the waveguide/modulator.

To further achieve the desired objects and advantages of the present invention a specific embodiment of a polymer waveguide/modulator including a lower cladding layer having a refractive index, the lower cladding layer including one of polymer material, dielectric material or semiconductor based material, a polymer core having a refractive index, a polymer upper cladding layer having a refractive index, a first protection/barrier layer sandwiched between the lower cladding layer and the core, and a second protection/barrier layer sandwiched between the core and the upper cladding layer. The first protection/barrier layer is designed to protect the lower cladding layer and the core from solvents and gases and to prevent current leakage between the lower cladding layer and the core. The first protection/barrier layer is optically transparent to light wavelengths in a range of 0.8 µm to 2 µm and is designed with a refractive index less than, greater than, or the same as the refractive index of the core and approximately equal to the refractive index of the lower cladding layer. The first protection/barrier layer includes one of metal material, dielectric material or semiconductor based material. The second protection/barrier layer is designed to protect the upper cladding layer and the core from solvents and gases and to prevent current leakage between the upper cladding layer and the core. The second protection/barrier layer is optically transparent to light wavelengths in a range of 0.8 µm to 2 µm and designed with a refractive index less than, greater than, or the same as the refractive index of the core and approximately equal to the refractive index of the upper cladding layer. The second protection/barrier layer includes one of metal material, dielectric material or semiconductor based material.

To further achieve the desired objects and advantages of the present invention, provided is a method of fabricating a polymer waveguide/modulator comprising the steps of: providing a platform; depositing a lower cladding layer having a refractive index on the platform; depositing a first protection/barrier layer on the lower cladding layer using a deposition technique including one of PVD, CVD, evaporation, sputtering, or MOCVD/MBE, the first protection/barrier layer including one of metal material, dielectric material or semiconductor based material; depositing a polymer core on the first protection/barrier layer, the polymer core having a refractive index, the first protection/barrier layer being designed to protect the lower cladding layer and the core from solvents and gases and to prevent current leakage between the lower cladding layer and the core, and the first protection/barrier layer being optically transparent to light wavelengths in a range of 0.8 μm to 2 μm and designed with a refractive index less than, greater than, or the same as the refractive index of the core; depositing a second protection/barrier layer on the polymer core using a deposition technique including one of PVD, CVD, evaporation, sputtering, or MOCVD/MBE, and the second protection/barrier layer being optically transparent to light wavelengths in a range of 0.8 μm to 2 μm and designed with a refractive index less than, greater than, or the same as the refractive index of the core, the second protection/barrier layer including one of metal material, dielectric material or semiconductor based material; and depositing an upper cladding layer having a refractive index on the second protection/barrier layer, the second protection/barrier layer being designed to protect the upper cladding layer and the core from solvents and gases and to prevent current leakage between the upper cladding layer and the core, and the refractive index of the upper cladding layer being approximately equal to the refractive index of the second protection/barrier layer.

BRIEF DESCRIPTION OF THE DRAWINGS

Specific objects and advantages of the invention will become readily apparent to those skilled in the art from the following detailed description of a preferred embodiment thereof, taken in conjunction with the drawings in which.

DETAILED DESCRIPTION OF THE DRAWINGS

Figure 1A:
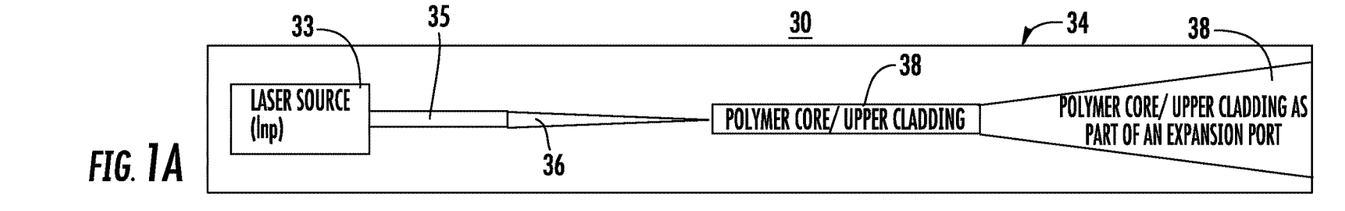
FIG. 1A is a top view of an integrated laser/polymer modulator with semiconductor waveguide taper coupling and polymer waveguide and expansion port.
Figure 1B:
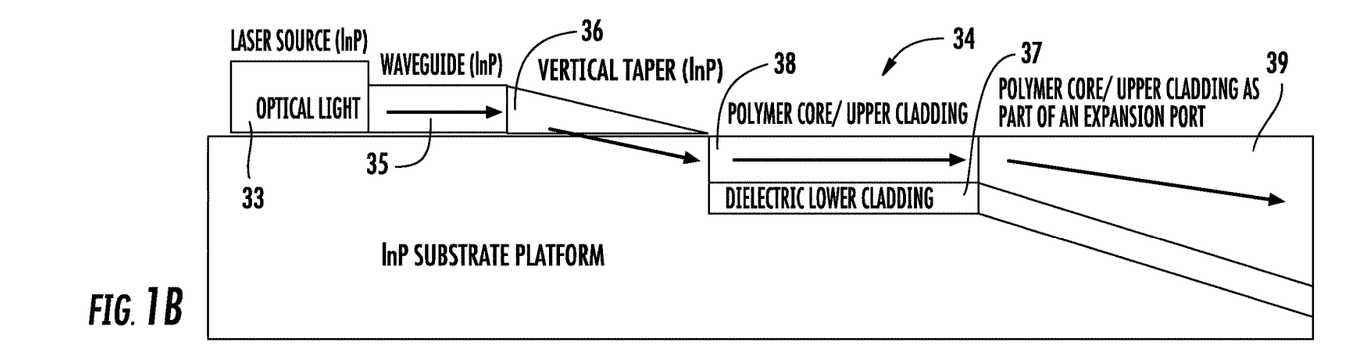
FIG. 1b is a cross-sectional side view of the integrated laser/polymer modulator of FIG. 1A.

Turning now to FIGS. 1A and 1B, a first example of a monolithic photonic integrated circuit, PIC 30, is illustrated. PIC 30 includes an InP platform 32 with a monolithic laser 33 formed in/on platform 32 as part of platform 32 and a polymer waveguide/modulator 34 monolithically built onto platform 32. Monolithic laser 33 could be a distributed feedback (DFB) laser, a Fabry-Perot (FB) laser, a distributed Bragg reflector (DBR) laser, or a tunable laser. A section 35 of InP waveguide is formed on/in platform/substrate 32 in optical alignment with laser 33. A second section 36 of InP waveguide is formed in optical alignment with section 35 and is tapered, both vertically and horizontally into an output point.

In this specific example, a trench is formed (e.g. etching, etc.) in platform/substrate 32 generally in optical alignment with laser 33 but on a lower level. The trench is formed with a first constant dimensions section and with a gradually expanding, horizontally and vertically downward, section. A dielectric lower cladding layer 37, with excellent thickness control, is deposited in the trench to planarize the surface prior to polymer deposition and to provide a lower cladding layer for the waveguides and modulator. It will be understood that while dielectric lower cladding layer 37 is used in this example to show the versatility, the lower cladding layer could include a polymer layer if so designed.

Polymer based material 38 is deposited in the trench on dielectric layer 37 in the first section to form a core and upper cladding layer. Polymer based material 38 includes a polymer waveguide/modulator 34, i.e. the modulator and input waveguides of PIC 30, which are optically aligned with InP waveguide section 36. That is the output point of tapered section 36 is horizontally aligned and vertically above the input of waveguide/modulator 38 so that light from laser 33 is coupled down through the vertical taper formed by the overlying waveguide portions into waveguide/modulator 38. The tapered section of the trench is filled with polymer based material which forms an expansion port 39 to facilitate coupling light efficiently to optical fibers and the like. The light path for light generated by laser 33 is depicted by arrows extending through waveguide 35, vertical taper 36, polymer waveguide/modulator 34, and expansion port 39.

Figure 2:
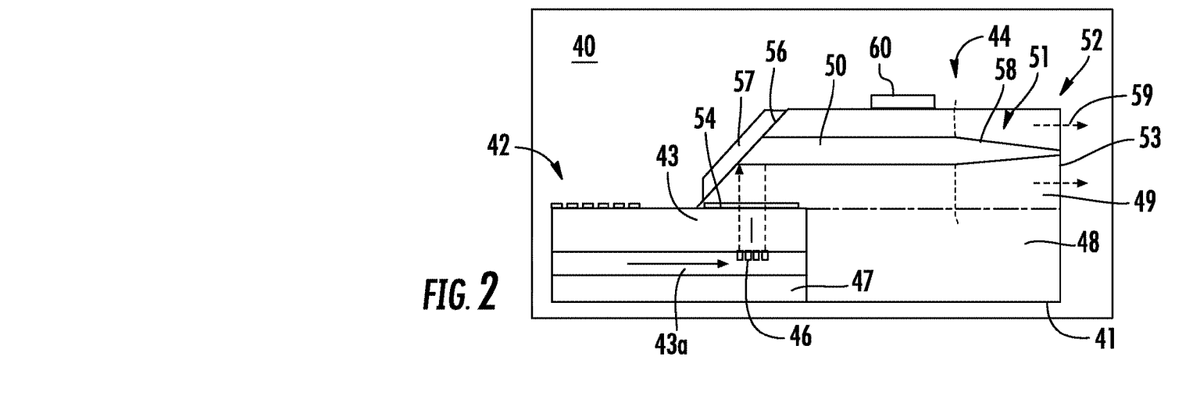
FIG. 2 is a cross-sectional side view of an example of a narrow spot design for a guide transition device incorporating a grating deflector and an angular deflection surface.

Referring now to FIG. 2, a second specific example of a guide transition device, designated 40, is provided. In this specific example, a monolithic semiconductor laser 42 and a polymer waveguide modulator 44 are included in device 40 and fabricated on a substrate 41, which in this specific embodiment is monolithic InP but can be other semiconductors or metals, such as silicon, silicon carbide, GaN, GaAs, InSb, metals, sapphire, etc. Monolithic laser 42 can be a distributed feedback (DFB) laser, a Fabry-Perot (FB) laser, a distributed Bragg reflector (DBR) laser, a tunable laser, VCSEL (Vertical Cavity Surface Emitting Laser) or any other type of semiconductor laser. Laser 42 includes an output semiconductor waveguide 43 (with a core 43a) which has a digital grating 46 formed therein adjacent a distal end 47. For purposes of this disclosure, the portion of output semiconductor waveguide 43 receiving a light beam from laser 42 can be considered a "light input port". Digital grating 46 is specifically designed to turn light from source/laser 42 vertically upwardly. Here it should be understood that digital grating 46 could be replaced with a lower angular deflection surface formed by etching end 47 at an angle through to the upper surface of substrate 41. A lower polymer layer 48 is deposited on substrate 41 to planarize substrate 41 beyond end 47. Alternatively, an insulating oxide or nitride could be deposited on substrate 41 to planarize substrate 41. These techniques are also compatible with use of a lower electrode to enable vertical poling in the polymer waveguide.

A relatively thick lower cladding layer 49 is deposited on the upper surfaces of laser 42 and lower polymer layer 48, a core polymer is deposited on the upper surface of lower cladding layer 49 and etched to form a waveguide core 50, and an upper polymer cladding layer 51 is deposited around waveguide core 50 to form a polymer waveguide 52. In some instances it may be desirable to deposit an anti-reflective (AR) coating 54 on the upper surface of output semiconductor waveguide 43 prior to depositing lower cladding layer 49 to reduce or remove any reflections at the abutting surfaces. Usually the AR coating can be completed via dielectric deposition using CVD, PECVD, sputtering, ebeam, etc. Materials for the dielectric coating can be, for example, oxides, nitrides, and combinations thereof deposited with a thickness for anti-reflection properties. Also, a relatively thick lower cladding layer 49 is deposited to minimize light leakage from polymer core 50 to substrate 41.

In this second specific example, lower cladding layer 49, core 50, and upper polymer cladding layer 51 (i.e. polymer waveguide 52) are etched at an angle and through to the upper surface of output semiconductor waveguide 43 to form an angular deflection surface 56. In this example, digital grating 46 and angular deflection surface 56 are included in the plane shifting apparatus that shifts light from the laser source 42 on one plane to waveguide 52 and a light output surface or port 53 on a different plane. The angle of surface 56 is selected/formed to be compatible with the amount digital grating 46 or a lower angular deflection surface is designed to turn or deflect light, resulting in high optical coupling into waveguide 52. In this preferred embodiment, digital grating 46 deflects the received light beam at an angle of approximately 90 degrees (plus or minus 10 degrees) and deflection surface 56 is compatible to deflect the received light beam into waveguide core 50 parallel to the second plane. To further enhance reflection at angular deflection surface 56, a high reflective coating 57 can be deposited on the outer surface of angular deflection surface 56. In this specific example, polymer waveguide modulator 44 is formed in waveguide 52 between angular deflection surface 56 and taper 58 of core 50. Modulator 44 can be for example, a Mach-Zehnder modulator, an intensity or phase modulator, etc.

Figure 3A:
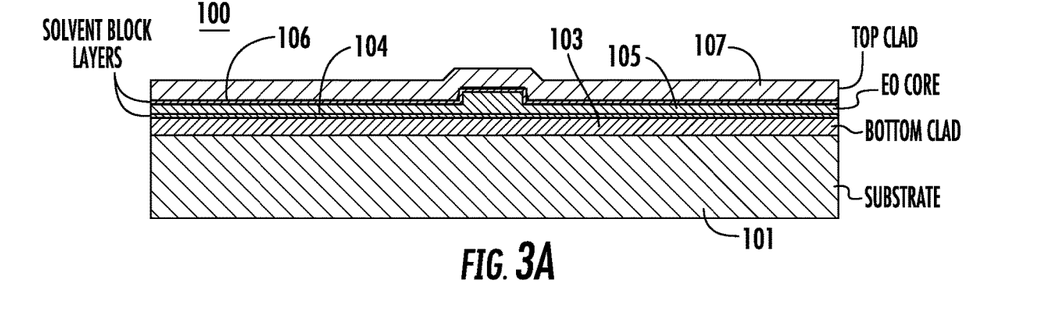
FIGS. 3A and 3B illustrate a method of fabricating a polymer modulator using a ridge waveguide with 3-layer stack, in accordance with the present invention.

Turning now to FIGS. 3A, 3B, 4A, and 4B, examples of waveguides that can be used in either of the above or similar apparatus incorporating polymer waveguides are illustrated. Specifically, the present invention can be included in polymer waveguide/modulator 34 of FIGS. 1A and 1B or as polymer waveguide 52 in FIG. 2. Referring specifically to FIG. 3A a waveguide 100, shown for a specific example as a ridge waveguide, is illustrated. Waveguide 100 is fabricated on a substrate 101 and includes a bottom or lower cladding layer 103, an electro-optic (EO) polymer core 105, and an upper or top cladding layer 107. In accordance with the present invention, a first or lower solvent and gas blocking layer 104 is sandwiched between bottom cladding layer 103 and EO core 105 and a second or upper solvent and gas blocking layer 106 is sandwiched between EO core 105 and top cladding layer 107. In the preferred embodiment, polymer layers 103, 105, and 107 are deposited in a liquid form which naturally incorporates solvent that might affect underlying or overlying layers. Also, in addition to various solvents that may be present during fabrication, gasses, such as oxygen and moisture, may be present and can adversely affect the polymer and, hence, the waveguide.

Figure 3B:
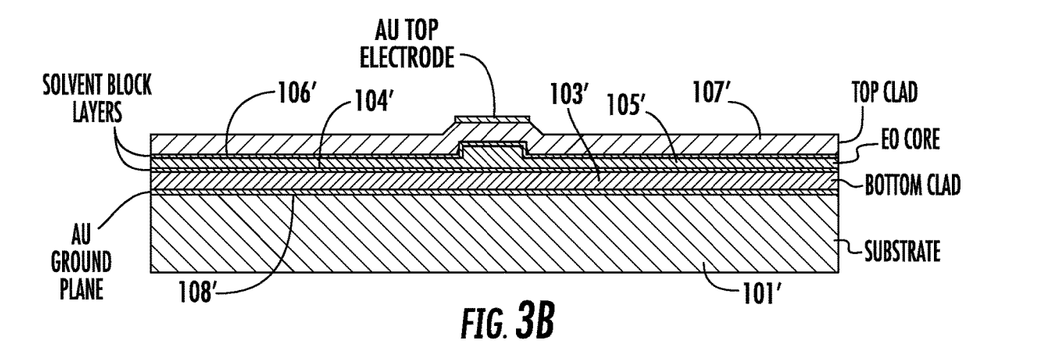

Referring specifically to FIG. 3b a different example designated 100', of waveguide 100 from FIG. 3A is illustrated with similar components designated with similar numbers having a prime added to indicate the different example. Waveguide 100' is fabricated on a substrate 101' and includes a bottom or lower cladding layer 103', an electro-optic (EO) polymer core 105', and an upper or top cladding layer 107'. In accordance with the present invention, a first or lower solvent blocking layer 104' is sandwiched between bottom cladding layer 103' and EO core 105' and a second or upper solvent blocking layer 106' is sandwiched between EO core 105' and top cladding layer 107'. Further, a layer of metallization 108', such as Au, Ti/Au, or Cr/Au, operates as a ground plane in waveguide 100'. A modulator generally includes coplanar electrodes for poling and modulation unless a metal layer is deposited on the substrate below the polymer layers, hence metallization 108'.

Figure 4A:
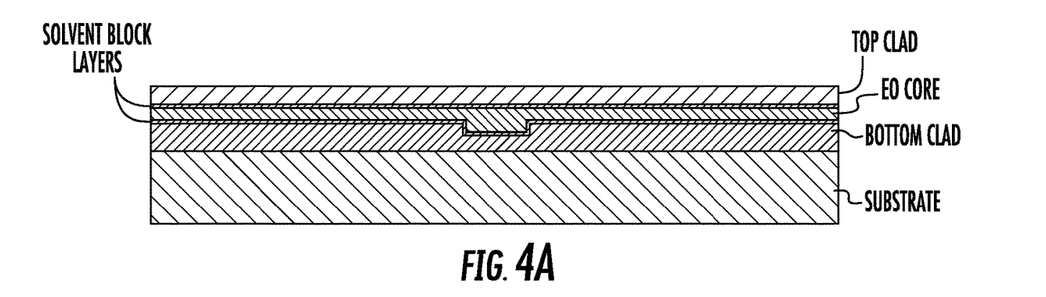
FIGS. 4A and 4B illustrate a method of fabricating a polymer modulator using an inverted ridge waveguide with 3-layer stack, in accordance with the present invention.
Figure 4B:
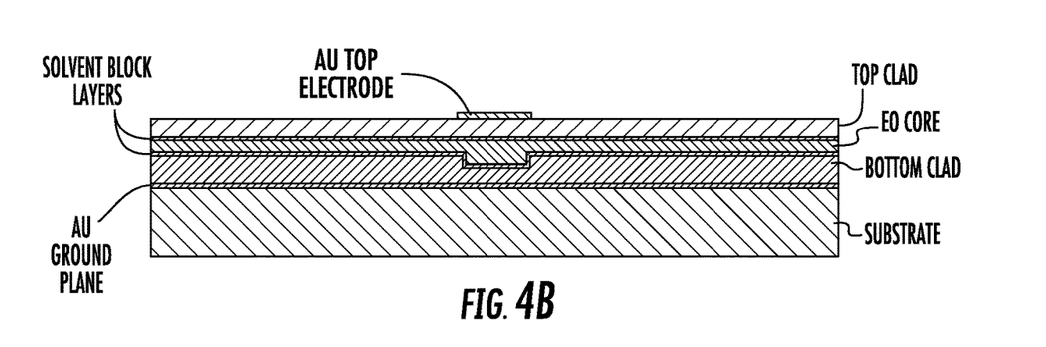

Referring specifically to FIGS. 4A and 4B, substrates similar to those illustrated in FIGS. 3A and 3B are illustrated except that an inverted ridge waveguide is illustrated. In all other respects the waveguides in FIGS. 4A and 4B are similar to the waveguides illustrated in FIGS. 3A and 3B.

Some examples of materials which can be used in lower and upper solvent and gas blocking (barrier) layers 104 and 106 that provide solvent protection include: thin (~30 Å to ~100 Å) metal based materials to allow for optical transparency; dielectric based materials (e.g. SiON with refractive index of 1.68); polymer based material (making sure solvents are compatible); and any of the materials having an optical refractive index in a range of 1.0 to 3.0 (ideally 1.68). As an example, when using Ultem (polythermide resin) polymer materials as the core layer (105 or 105' in the above examples), the refractive index is in a range of 1.65 to 1.75 and the lower and upper cladding layers each have a refractive index in a range of +/−0.07 to 0.01 the refractive index of the ultem polymer material so the delta between the core/barrier and cladding layers should be +/−0.02, the ideal barrier having a refractive index around 1.68. Typical properties for the lower and upper solvent and gas blocking (barrier) layers 104 and 106 include: protects against solvents and gasses such as oxygen; prevents other contaminants from entering or affecting the polymer; and deposition techniques include PVD, CVD, evaporation, sputtering, ALD (atomic layer deposition), and MOCVD/MBE. More specifically, when using a polymer based protection layer for solvent protection, the layer could be an organic material deposited using sputtering/CVD in a plasma and dry (not liquid) environment, this would be similar to sputtering/CVD a dielectric layer.

When using a thin metal protection layer for solvent/gas protection, metals at a thickness of approximately 100 Å or less are transparent to light. Thicker metal has good gas (e.g. oxygen) barrier properties as indicated by the following examples: a 12.7 polyester (PET) film allows moisture of 31 g/m$^2$ per day, oxygen of 465 ml/m$^2$ per day, and 91 UV light at 96 transmittance; when metallized with a layer approximately 0.5 μm thick, the PET barrier allows moisture of 0.8 g/m$^2$ per day, oxygen of 1.2 ml/m$^2$ per day, and 5 UV light at 96 transmittance; with 6 μm of aluminum foil on the PET barrier no moisture or oxygen passes through. Aluminum is the most common metal used on polymers followed by nickel and chromium but aluminum has the advantage of being a common technology. Other metals that can be used to metallize polymers include noble metals and metals that naturally or with assistance oxidize. Metal has a reasonable optical performance in a thickness range from 30 Å to 100 Å with a conformal layer (minimum pin-holes) and good uniformity of coverage when deposited using PVD, CVD, evaporation, or sputtering.

Figure 5:
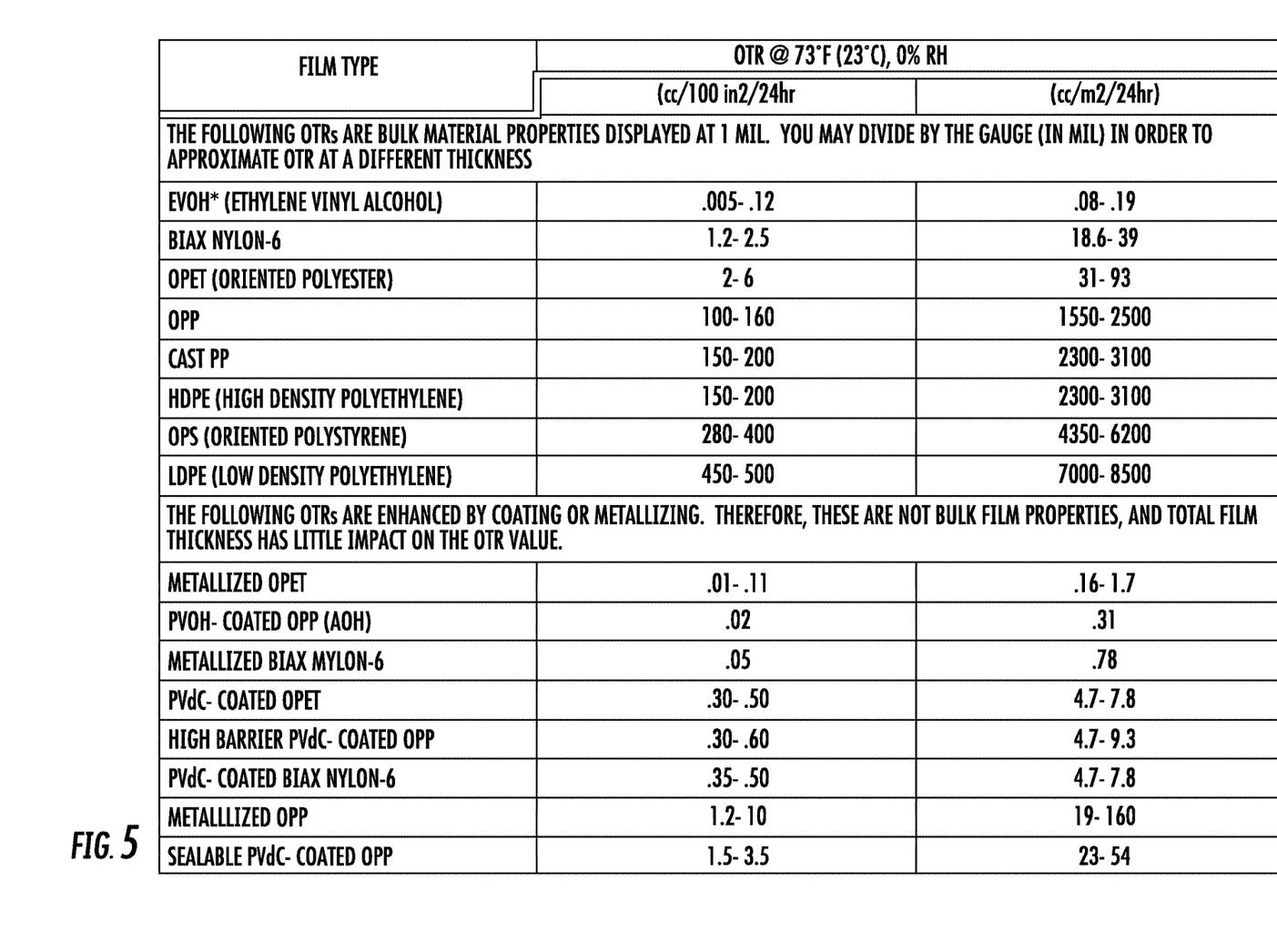
FIG. 5 is a chart listing the oxygen transmission rate for various polymer film types.

Referring to FIG. 5, a chart listing the oxygen transmission rate (OTR) for various polymer film that can be incorporated into lower and upper solvent and gas blocking layers 104 and 106, respectively, is illustrated. The first eight materials listed show bulk material properties displayed at 1 mil. thickness. In order to approximate the OTR at different thicknesses, the illustrated numbers can be divided by the desired thickness in mils. The bottom eight materials are enhanced by coating or metallizing and therefore are not bulk film properties. The chart indicates the advantage obtained by coating or metallizing the polymer films.

Protection or barrier layers 104 and 106 must also be able to withstand an electrical charge without allowing current leakage. Dielectric based materials (e.g. oxides and nitrides) generally have this characteristic. To qualify for the protection or barrier layer the dielectric material should have the following characteristics: optically transparent to wavelengths 0.8 µm to 2 um with a preferred wavelength of 1.2 um to 1.6 um; thickness in a range of 50 Å to 30,000 Å, with a preferred thickness of 50 Å to 300 Å; prevents electrical leakage similar to a reverse junction diode (i.e. leakage current less than 1 nA); and can be deposited with deposition techniques including PVD, CVD, evaporation, sputtering, ALD (atomic layer deposition), and MOCVD/MBE. Thermally grown oxides and nitrides of silicon also create a good protection layer for solvents and gasses. Polymers can also become an electrical charge protection or barrier layer. Other dielectric materials that can be used as a protection or barrier layer include: aluminum oxide, hafnium oxide, silicon oxide, titanium oxide, zirconium oxide, zinc oxide, indium tin oxide, indium oxide, and strontium and calcium vanadate. Various nitrides and oxynitrides (ON) can also be used, not only binary compounds (e.g. AlN) but ternary compounds (e.g. Al(x)X(y)N). Typically oxides, nitrides, and oxynitrides can be described as A(x)B(y), where both x and y can lie in a range from 0 to 1.

Various film types that can be incorporated into lower and upper protection or barrier layers 104 and 106, include materials having an optical refractive index in a range of 1.0 to 3.0. For example, $SiO_xN_x$ has an index tunable from 1.45 to 2.0, so that index values of 1.68+/−0.02 can be designed. Typically, nitrozation of silicon (Si) at high temperatures is used for the production of $SiO_xN_x$, but plasma for low temp $SiO_xN_x$ can be processed, which is helpful for depositing it on polymers. The conductivity of the top cladding layer and the upper protection layer can also be changed through doping. The ideal refractive index of the barrier and cladding layers for an ultem polymer material core (refractive index of 1.7) is 1.68 but could be in a range of 1.63 to 1.69. The refractive index of some potential barrier materials are as follows: aluminum oxide index is 1.76; titanium oxide index is 2.49 to 2.61; tin oxide index is 2.00; and epoxy silane index is 1.53.

Figure 6:
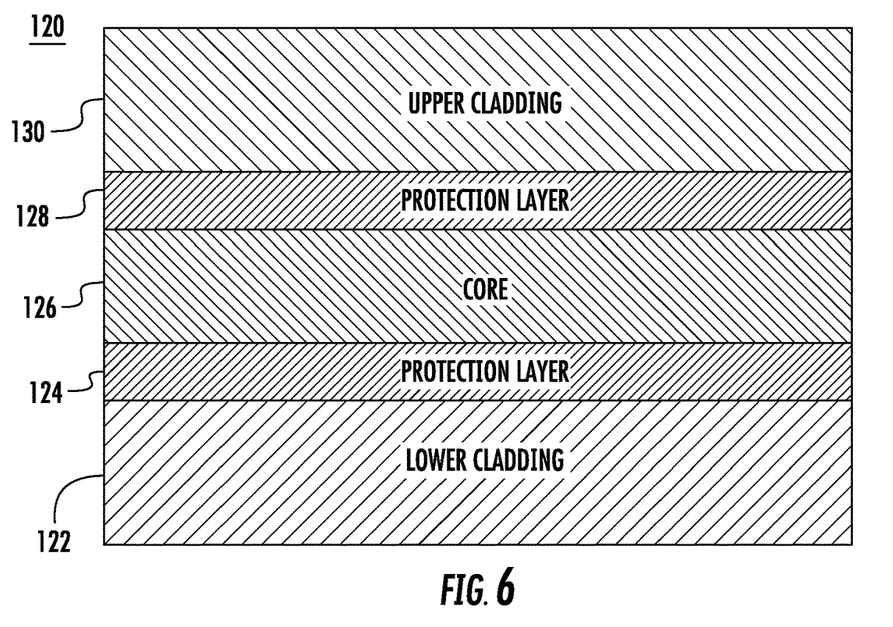
FIG. 6 is a cross-sectional view of a waveguide illustrating protection layers above and below the core.

Turning now to FIG. 6, a waveguide 120 is illustrated which includes a lower cladding layer 122, a protection or barrier layer 124 on lower cladding layer 122, a core 126 on protection or barrier layer 124, an upper protection or barrier layer 128 on core 126, and an upper cladding layer 130 on upper protection or barrier layer 128, constructed in accordance with the present invention. When core 126 includes ultem polymer material (having an index of refraction of 1.7), an ideal refractive index of cladding layers 124 and 128 is 1.68, but could be in a range of 1.63 to 1.69. Also, protection or barrier layers 124 and 128 ideally have a refractive index of 1.68 but in other embodiments could be 0.01 lower or 0.01 higher. Because the protection or barrier layers in any of the disclosed examples are so thin (30 Å to 100 Å), the effect of the refractive index on the waveguide is optically minimal. In FIG. 6, lower cladding layer 122 could be polymer and/or dielectric material and could even be semiconductor based material. Protection or barrier layers 124 and 128 could be metal dielectric or semiconductor material. Core 126 is polymer material. Upper cladding layer 130 is preferably polymer material but could be dielectric and/or semiconductor material. It should be understood that while upper and lower cladding layers could, in some applications, include material other than polymers, the waveguide or modulator is referred to herein as a "polymer waveguide" or "polymer modulator" because the core is polymer and the upper and lower cladding layers are preferably polymer. Also, it will be understood that the modulators discussed herein are formed in waveguides, hence the term "waveguide/modulator" since the invention can apply to simply waveguides or modulators fabricated in waveguides.

Figure 7:
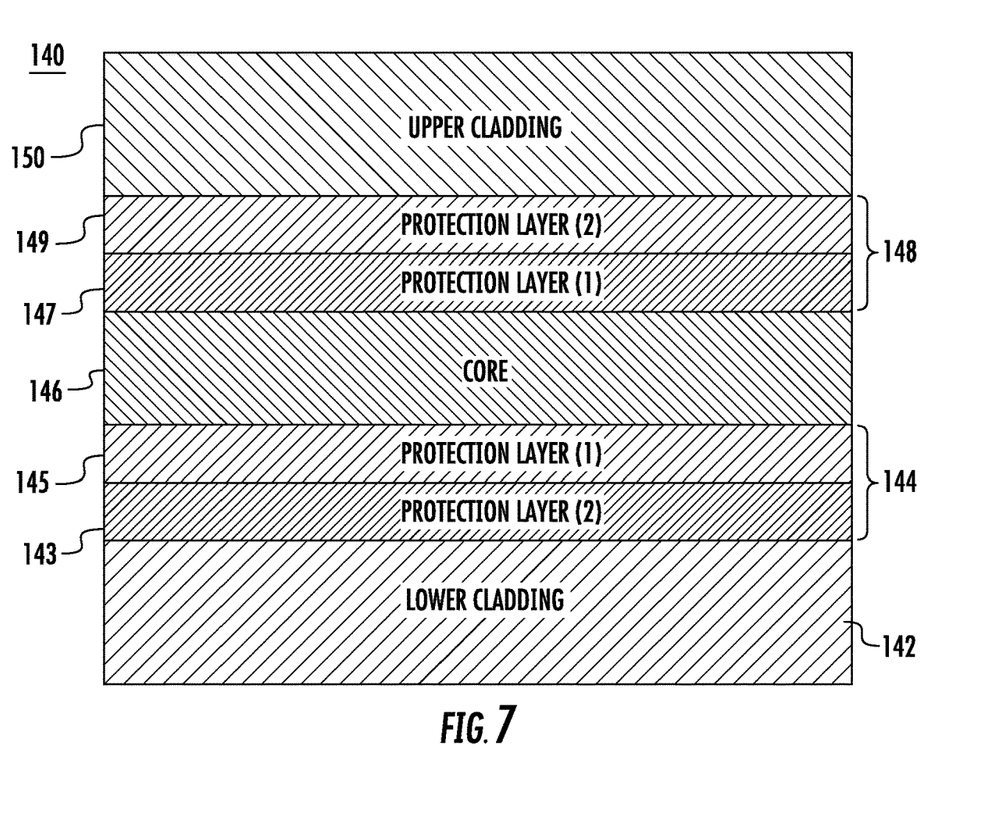
FIG. 7 is a cross-sectional view of a waveguide illustrating multi-layer protection layers above and below the core.

Referring additionally to FIG. 7, another example of a waveguide, designated 140, is illustrated. Waveguide 140 includes a lower cladding layer 142, a core 146 and an upper cladding layer 150. The difference is that a protection or barrier layer 144 between lower cladding layer 142 and core 146 includes two layers or sub-layers 143 and 145. Also, a protection or barrier layer 148 between core 146 and upper cladding layer 150 includes two layers or sub-layers 147 and 149. In this example, the index of refraction for sub-layers 145 and 147 is equal or higher than the index of refraction of sub-layers 143 and 149, respectively. Both of the sub-layers 143, 145 and 147, 149 are optically transparent. The index of refraction for sub-layers 145 and 147 can be, for example, 1.69 and the index of refraction for sub-layers 143 and 149 can be, for example, 1.68.

Figure 8:
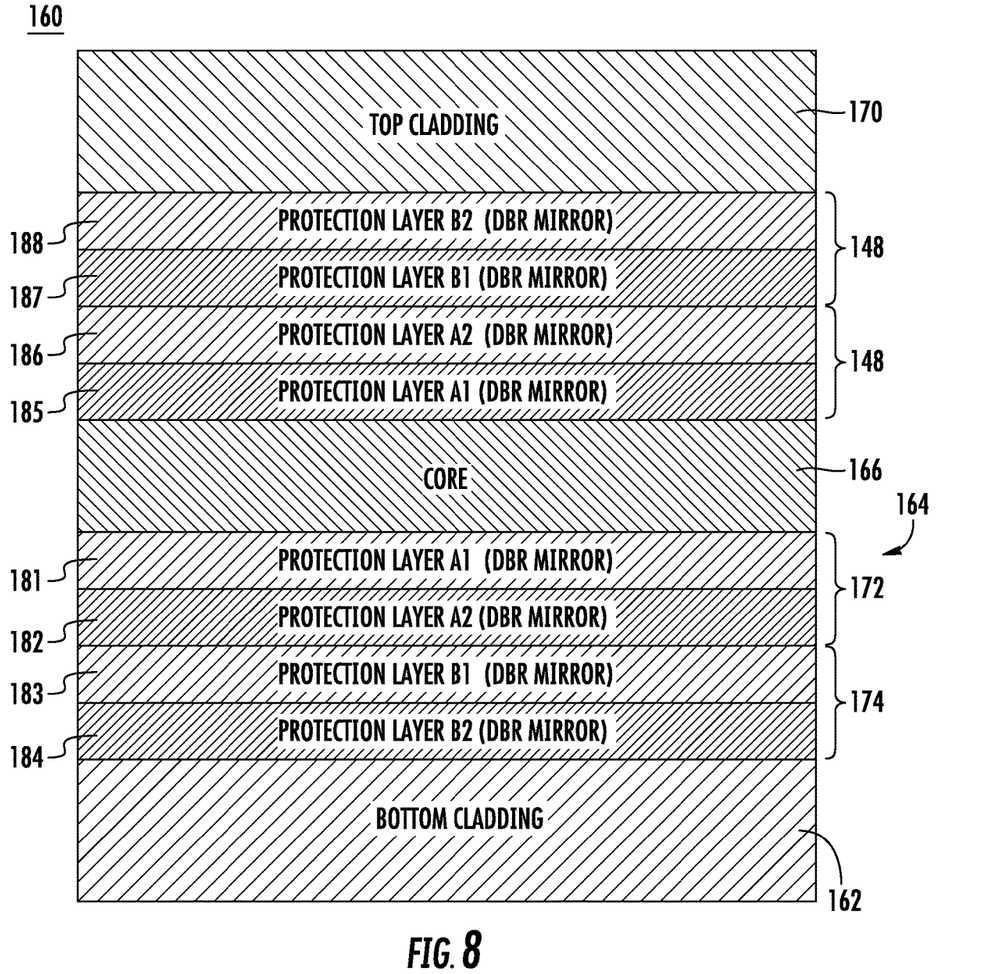
FIG. 8 is a cross-sectional view of a waveguide illustrating multiple multi-layer protection layers above and below the core.

Referring additionally to FIG. 8, another example of a waveguide, designated 160, is illustrated. Waveguide 160 includes a lower cladding layer 162, a core 166 and an upper cladding layer 170. The difference is that a protection or barrier layer 164 between lower cladding layer 162 and core 166 includes two sub-layers 172 and 174 each further including two sub-layers 181/182 and 183/184, respectively. Also, a protection or barrier layer 168 between core 166 and upper cladding layer 170 includes two sub-layers 176 and 178 each further including two sub-layers 185/186 and 187/188, respectively. In this example, the index of refraction for sub-layers 181, 183, 185, and 187 is higher than the index of refraction of sub-layers 182, 184, 186, and 188, respectively. All of the sub-layers 181-184 and 185-188 are optically transparent. In this example, the thicknesses of the mirror pairs (i.e. 181/182, 183/184, 185/186, and 187/188) can be set to a quarter wavelength of any optical beam being carried by waveguide 160. Because of the difference in the index of refraction for the sub-layer pairs, each of the multi-sub-layered protection or barrier layers 164 and 168 operate as a DBR mirror or a fine tuned optical filter. Both of the protection or barrier layers 164 and 168 are optically transparent.

Thus, new and improved waveguide protection or barrier layers are disclosed. The new and improved protection layers are especially useful for polymer modulators/waveguides. The new and improved protection or barrier layers are specifically designed to provide protection from various solvents, gasses and for electrical charges. Also, the new and improved protection layers provide optical continuity with similar optical refractive indices for cladding and core layers.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A method of fabricating a polymer waveguide/modulator comprising the steps of:
    providing a platform;
    depositing a lower cladding layer having a refractive index on the platform;
    depositing a first protection/barrier layer on the lower cladding layer using a deposition technique including one of PVD, CVD, evaporation, sputtering, or MOCVD/MBE, the first protection/barrier layer including one of metal material, dielectric material or semiconductor based material;
    depositing a polymer core on the first protection/barrier layer, the polymer core having a refractive index, the first protection/barrier layer being designed to protect the lower cladding layer and the core from solvents and gases and to prevent current leakage between the lower cladding layer and the core, and the first protection/barrier layer being optically transparent to light wavelengths in a range of 0.8 µm to 2 µm and designed with a refractive index less than, greater than, or the same as the refractive index of the core;
    depositing a second protection/barrier layer on the polymer core using a deposition technique including one of PVD, CVD, evaporation, sputtering, or MOCVD/MBE, and the second protection/barrier layer being optically transparent to light wavelengths in a range of 0.8 µm to 2 µm and designed with a refractive index less than, greater than, or the same as the refractive index of the core, the second protection/barrier layer including one of metal material, dielectric material or semiconductor based material; and
    depositing an upper cladding layer having a refractive index on the second protection/barrier layer, the second protection/barrier layer being designed to protect the upper cladding layer and the core from solvents and gases and to prevent current leakage between the upper cladding layer and the core, and the refractive index of the upper cladding layer being approximately equal to the refractive index of the second protection/barrier layer.

2. The method as claimed in claim 1 wherein the lower cladding layer includes one of polymer material, dielectric material or semiconductor based material.

3. The method as claimed in claim 1 wherein the upper cladding layer includes one of polymer material, dielectric material and/or semiconductor based material.

4. The method as claimed in claim 1 wherein the first and second protection/barrier layers each have a thickness in a range of 50 Å to 50,000 Å.

5. The method as claimed in claim 1 wherein the first protection/barrier layer reduces current leakage between the lower cladding layer and the core to less than 1 nA and the second protection/barrier layer reduces current leakage between the upper cladding layer and the core to less than 1 nA.

6. The method as claimed in claim 1 wherein the polymer core includes ultem polymer material with a refractive index in a range of 1.65 to 1.75 and the lower and upper cladding layers each have a refractive index in a range of +/−0.07 to 0.01 the refractive index of the ultem polymer material.

7. The method as claimed in claim 1 wherein the polymer core includes ultem polymer material with a refractive index of 1.7 and the lower and upper cladding layers each have a refractive index of 1.68 and the first and second protection/barrier layers each have a refractive index of 1.7+/−0.02.

8. The method as claimed in claim 1 wherein the steps of depositing the first and the second protection/barrier layers each include depositing multiple sub-layers.

9. The method as claimed in claim 1 wherein the polymer core includes ultem polymer material with a refractive index of 1.7 and the first and second protection/barrier layers each include two sub-layers, with a sub-layer adjacent the core having a 1.69 refractive index and a sub-layer adjacent the lower cladding layer and the upper cladding layer, respectively, having a 1.68 refractive index.

10. The method as claimed in claim 1 wherein the first and second protection/barrier layers each include multiple pairs of sub-layers, each pair of sub-layers including a first sub-layer positioned closest to the core having a refractive index higher than a refractive index of a second sub-layer positioned farther from the core.

11. The method as claimed in claim 1 wherein the lower cladding layer and the upper cladding layer both include polymer material and the lower cladding layer, the core, and the upper cladding layer are all deposited in liquid form.

* * * * *